United States Patent [19]
Lavery

[11] 3,815,407
[45] June 11, 1974

[54] RESONANCE TIRE INSPECTION METHOD AND APPARATUS

[75] Inventor: Adelbert L. Lavery, Natick, Mass.

[73] Assignee: The United States of America as represented by the Secretary of the Department of Transportation, Washington, D.C.

[22] Filed: Jan. 22, 1973

[21] Appl. No.: 325,392

[52] U.S. Cl. .................................. 73/67.2, 73/146
[51] Int. Cl. ......................................... G01h 13/00
[58] Field of Search ............. 73/67, 67.2, 67.5, 146

[56] References Cited
UNITED STATES PATENTS

| | | | |
|---|---|---|---|
| 3,148,535 | 9/1964 | Lemelson.......................... | 73/146 X |
| 3,411,344 | 11/1968 | Lloyd................................. | 73/67.2 |
| 3,604,249 | 9/1971 | Wilson............................... | 73/67.2 |

Primary Examiner—Richard C. Queisser
Assistant Examiner—John P. Beauchamp
Attorney, Agent, or Firm—Herbert E. Farmer; Nathan Edelberg; Harold P. Deeley

[57] ABSTRACT

The non-destructive testing of tires to determine the presence of structural defects is accomplished by measuring imbalance in the transmission characteristics of a tire from the tread area to a pair of oppositely disposed points on the side walls as a test tire is rotated and contacted on the tread area by a vibrator which is caused to track a resonant frequency of the tire. Variations in resonant frequency as well as variations in transmission characteristics which do not unbalance the symmetry of the tire are also measured and the information collected permits identification of both the presence and nature of hidden defects.

11 Claims, 2 Drawing Figures

PATENTED JUN 11 1974

3,815,407

3,815,407

RESONANCE TIRE INSPECTION METHOD AND APPARATUS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates to the non-destructive testing of pneumatic tires. More specifically, this invention is directed to methods of and apparatus for testing pneumatic tire casings for defects which are not apparent through visual inspection and while the tire is inflated and mounted on a wheel. Accordingly, the general objects of the present invention are to provide novel and improved methods and apparatus of such character.

2. Description of the Prior Art

Pneumatic tire casing failures, and particularly catastrophic failures such as high speed "blowouts," are known to be attributable to a number of cases or defects. Some of these defects, such as cuts, tread chunking and uneven wear, may be noted during a visual inspection. Other "hidden" defects, such as broken cords and ply separation, are usually not apparent upon visual examination. It is, of course, desirable that some means be provided for determining the presence of any defect which may result in a sudden tire casing failure. In order to be susceptible of wide spread usage, the testing technique and apparatus must be capable of use during routine vehicle inspections and/or spot checks. This capability imposes the requirement that the non-destructive testing be performed while the tire is mounted on a vehicle wheel and inflated.

A number of techniques and apparatus for the non-destructive testing of pneumatic tires have previously been proposed. The present invention is directed to that class of testing device which employs a vibrating transducer and measures changes in vibrating patterns caused by defects. This type of prior art testing apparatus is exemplified by U.S. Pat. No. 3,604,249 to D. G. Wilson.

Prior art vibratory testing techniques, such as that described in above-referenced U.S. Pat. No. 3,604,249, have a number of inherent disadvantages. Thus, by way of example, previous measuring techniques are sensitive to local variations in tire mass and elasticity and also to variations in coupling between the source and pickup transducers and the tire. Prior art non-destructive testing methods were also unable to differentiate between defects and normal variances in tire structure. Further, since the measured data as provided by the prior art receiver transducers was characterized by a rather complex waveform, non-destructive testing of tires could not previously be readily automated. Perhaps the basic disadvantage of the prior art, however, was the fact that the testing techniques did not provide sufficient information to enable the nature of sensed defects to be identified.

SUMMARY OF THE INVENTION

The present invention overcomes the above briefly discussed and other disadvantages of the prior art by providing a novel and improved non-destructive testing technique for inflated pneumatic tire casings and apparatus for use in this novel method. In accordance with the present invention a source transducer is applied to the tire tread area and a pair of receiving transducers are coupled to the tire side walls; the receiving transducers being oppositely disposed and equally spaced from the source transducer. The source transducer is caused to vibrate at a resonant frequency of the test specimen and lack of symmetry in the signals generated by the two receiving transducers will thus provide an indication of the presence and nature of hidden structural defects in the tire casing; the defects being indicated by changes in vibrating patterns. In accordance with the invention, the source transducer frequency is maintained at the natural or resonant frequency of the cross-section of the tire casing being tested or at a harmonic thereof as the tire is rotated during the testing procedure.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
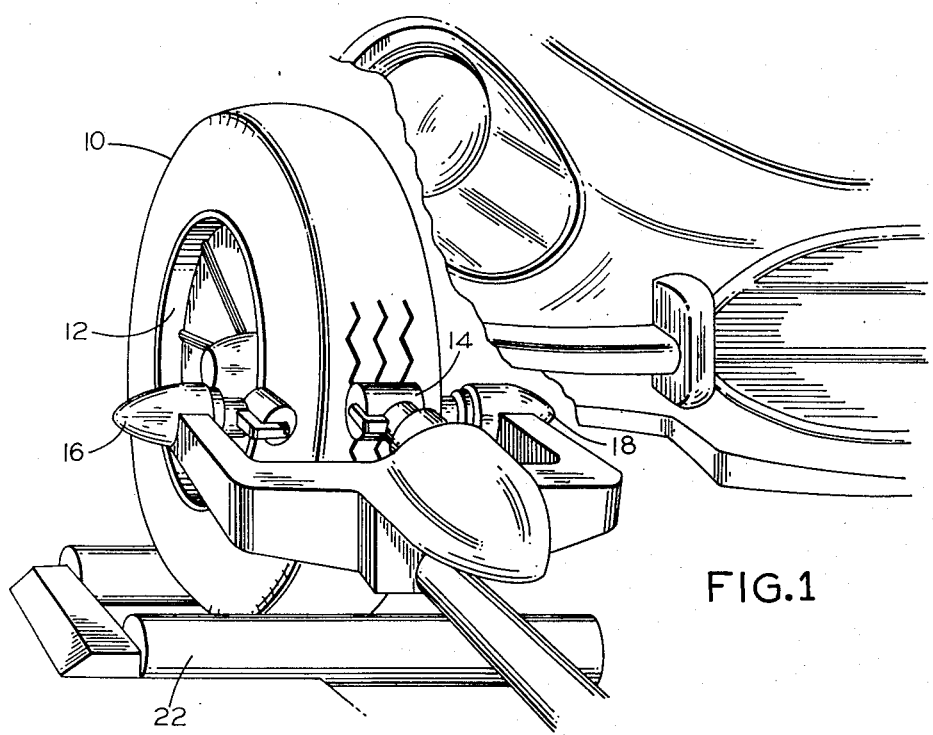
FIG. 1 is a perspective view which schematically illustrates a portion of tire test apparatus in accordance with a preferred embodiment of the invention.
Figure 2:
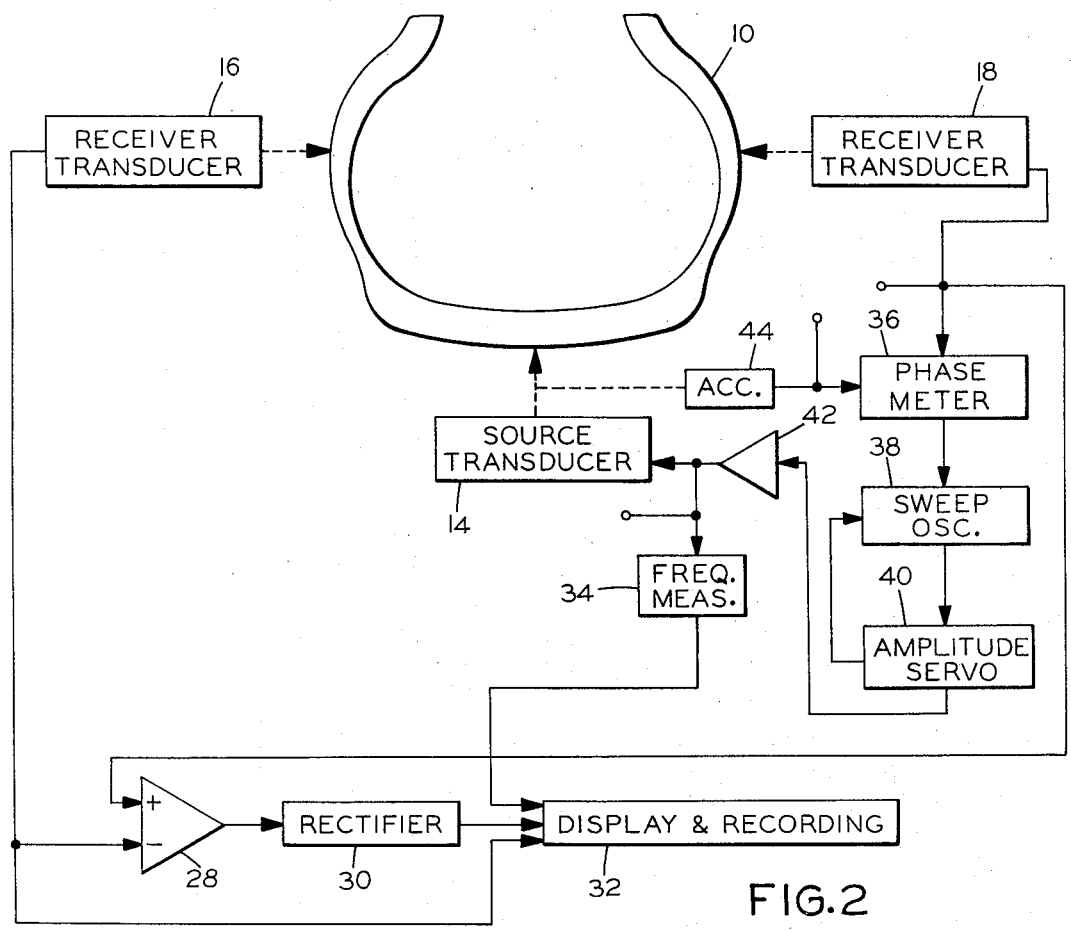
FIG. 2 is an electrical circuit block diagram of the embodiment of FIG. 1.

A tire casing 10 to be tested is depicted in FIG. 1 mounted on a wheel 12. It is to be observed that the disclosed embodiment of the invention permits the testing of tire 10 with wheel 12 mounted on a vehicle. The cross-section of tire 10 is shown in FIG. 2. The cross-section is described as that part of a tire that lies in a plane containing the axis of rotation. The cross-section thus encompasses the beads, side walls and tread portions of the tire. In accordance with the invention, a resonant mode is induced in the tire cross-section by a suitable vibrating transducer 14 to make the tire cross-section resonant at its lowest or natural frequency or at a harmonic of the natural frequency. Source transducer 14 will include a tire contacting roller driven by an electrically powered vibrator and means for maintaining the coupling between the roller and tire tread.

For purposes of explaining operation of the invention only, tire 10 will be considered as a simple series lumped parameter resonator. Accordingly, the natural frequency $\omega m$ and the damping ratio $\zeta$ of tire 10 may be expressed as follows:

$$\omega m = \sqrt{K/M} \tag{1}$$

$$\zeta = B/2 \sqrt{KM} \tag{2}$$

where:
$K$ = the spring constant of the tire casing;
$M$ = the tire mass; and
$B$ = the viscous damping constant of the casing.

For small deflections produced by source transducer 14, equations (1) and (2) reasonably approximate the actual complex equations which pertain to a tire casing. Equations (1) and (2) thus shown that if either the local mass or spring constant of the tire casing under test changes the resonant frequency will also change. Also since the attenuation of the input signal will vary as a function of frequency, mass, spring constant and damping constant, as suggested by equation (2), the amplitude of a signal (vibration) transmitted from a source transducer to a receiver transducer will also vary with these parameters. Accordingly, in a vibratory testing apparatus two measurement parameters; source transducer operating frequency and receiver amplitude; are measurable and four unknowns are presented; the unknowns being $\omega m$, $K$, $M$ and $B$. The only additional information available, or more precisely an assumption which may be made without seriously degrading the reliability of a test, is that the tire is inherently symmetrical in cross-section and that structural defects will upset this symmetry.

Continuing with the preceding theoretical discussion, it is noted that a tire may be considered symmetrical about a plane through the center of the tread although some lack of symmetry may be attributed to side wall thickness variations and to cosmetric additions such as white sidewalls. In a safety inspection the types of defect that are of greatest interest obviously are those which affect safety; i.e., cuts, tread chunking, uneven wear, broken cords and ply separations. In all cases these defects will affect the parameters M, K and B. However, since they are not distributed in nature, the presence of the enumerated defects will in general also upset the symmetry of the tire. Thus, in accordance with the present invention, defect detection is based upon observing changes in symmetry and resonant frequency while minimizing the interaction caused by changes in local mass, spring constant and damping.

Referring again to the drawing, a pair of receiving transducers 16 and 18 are coupled to the sidewalls of tire 10 and are equally spaced from source transducer 14. Transducers 16 and 18 may, for example, be of the same general type as depicted in FIG. 4 of referenced U.S. Pat. No. 3,604,249; care being taken to minimize friction, insure low sensor mass and to load the accelerometer coupled pick-up roller against the tire side wall with uniform force. The symmetry imbalance, measured as a difference in the output signals generated by receiver transducers 16 and 18, will be detected and displayed in the manner to be described below.

During the testing procedure the wheel 12, and thus the tire casing under test, will be rotated about its axle by tire tread contacting "road" wheels 22. The drive rollers 22 will be rotated by a variable speed electric motor.

As may be seen from FIG. 2, the detector-display circuitry of the disclosed embodiment of the invention includes a differential amplifier 28 to which the output signals of transducers 16 and 18 are delivered. An output of amplifier 28, commensurate with a lack of symmetry and thus the existence of a structural defect in tire 10, will be detected by rectifier 30 and delivered to display and/or recording apparatus 32.

Also in accordance with the invention, means for automatically controlling the frequency of source transducer 14 is provided. As described in the above theoretical discussion with reference to equations (1) and (2), the symmetry imbalance; i.e., the difference in amplitude between the vibrations measured at receiving transducers 16 and 18; will be indicative of a structural defect only if the interaction caused by the generally symmetrical variances in local mass, spring constant and damping are minimized by maintaining the source transducer frequency at the resonant frequency of the tire or at a harmonic thereof. In the disclosed embodiment frequency control is achieved by delivering the alternating output signal of receiver transducer 18 to a phase meter 36. Phase meter 36 may, for example, be a Model SD110 phase meter available from Spectral Dynamics Corporation of San Diego, Calif. Also applied to phase meter 36, which includes a phase meter section and a resonant dwell section, is a "reference" signal commensurate with the actual output frequency of source transducer 14; this reference signal being provided by an accelerometer 44 coupled to the source transducer. The output of the phase meter will be a frequency control voltage which is applied to a sweep oscillator 38. In accordance with one embodiment, sweep oscillator 38 and its associated amplitude servo 40 will comprise a Model SD114A sweep oscillator servo available from Spectral Dynamics Corporation of San Diego, Calif. The phase meter and sweep oscillator-servo will "lock on" to a specific resonant frequency of tire 10. When the resonant frequency changes, the frequency output of the sweep oscillator will change accordingly thereby tracking the frequency of resonance. The phase meter/resonant dwell circuit 36 will provide a d.c. voltage proportional to phase from the two applied input signals. This d.c. voltage is compared with an adjustable d.c. voltage and, when the resonant frequency of the test specimen shifts, an error signal will be generated and applied to sweep oscillator 38. The error signal will cause the sweep oscillator output frequency to shift either up or down to null the error signal whereupon the oscillator will stop "sweeping." The amplitude servo 40 maintains the amplitude of the output signal of the frequency control system at a constant level. This output signal is applied to a power amplifier 42 and, after amplification, to the vibrator in source transducer 14.

The resonant frequency of the test tire will be sensed by a frequency measuring device 34. The frequency measuring device 34 may, for example, comprise a frequency to voltage converter of a type well known in the art. The output of the frequency to voltage converter 34 will also be applied to recorder 32 whereby variations in resonant frequency may be observed and/or plotted.

The output of either of receiver transducers 16 and 18, receiver 16 in the disclosed embodiment, will be directly applied to recorder 32 as a third input thereto. This direct receiver transducer input provides information with respect to the transmission characteristic of the tire and the circumferential uniformity of the parameters K, M and B. As will be explained in further detail below, the third input to the display/recording device 32 will provide an indication of the presence of a defect which will cause a symmetrical change in the damping factor such as, for example, a cut or separation on the tread center line.

In operation of the invention, a ply separation will cause minimal change in the resonant frequency due to a change in local mass or spring constant but ply separation will change the damping. A change in damping with the defect off the plane of symmetry; i.e., off the tread center line; will unbalance the output of the two receiver transducers with the magnitude of the output signal decreasing on the side of the casing having the separation.

A separation or other defect on the center line will cause a change in the magnitude of the signals provided by both receiver transducers and thus results in a variation in the recorded output of transducer 16 which is not accompanied by an output from differential amplifier 28. A comparison of the outputs of transducer 16 and amplifier 28 will accordingly provide an indication of such a symmetrical defect.

An off-center cut will cause a change in resonant frequency by causing the spring constant to change. In addition, such a cut will also produce an output from the symmetry measurement with the output signal provided by the receiver transducer on the side with the cut decreasing.

Uneven tread wear or chunk-out will cause both a change in resonant frequency and a change in the amplitude of the receiver signals and, if asymmetrical, will produce a symmetry imbalance.

A heavy line splice, which is not considered a safety defect, will result in a decrease in resonant frequency and, since the variation is uniform, will not cause an imbalance in the outputs of the receiver transducers.

The apparatus and technique of the present invention, as described above, is suitable for the measurement of gross defects and as such is particularly well suited for field testing. However, in the design and manufacture of a tire it may be considered desirable to refine the test apparatus so as to provide additional information which will enable the solution of the actual complex equations which represent the characteristics of the tire. Thus, by way of example only, in the interest of insuring that the coupling between the source transducer and tire is maintained constant during the test it may be considered desirable to measure the driving point impedance. This can be accomplished by use of the output of accelerometer 44 and additionally through measurement of the power delivered to the source transducer in order to maintain the amplitude of the vibrations applied to the tire constant. The power required to impart a flexing of preselected magnitude at the resonant frequency of the tire will provide an indication of tire casing stiffness which is related to damping factor and spring constant. Also, by comparing the output of each receiver transducer to the output of source transducer 14, in the interest of measuring variations in amplitude and phase, additional information with respect to damping and spring constant may be determined.

While a preferred embodiment has been shown and described, as will be obvious from the immediately preceding discussion various modifications and substitutions may be made thereto without departing from the spirit and scope of the invention. Accordingly, it is to be understood that this invention has been described by way of illustration and not limitation.

What is claimed is:

1. A method for the non-destructive testing of tire casings comprising the steps of:
    rotating the casing about its axis;
    causing the casing to vibrate at a resonant frequency thereof during rotation;
    varying the frequency of the vibrations imparted to the exterior of the casing in the tread region to compensate for changes in resonant frequency caused by physical variations in the casing; and
    simultaneously detecting lack of symmetry in the transmission characteristics in the region of the casing by a pair of receiver transducers positioned on opposite casing sidewalls in the same radial cross-section of the casing at which the vibrations are imparted to the casing.

2. The method of claim 1 wherein the step of causing the casing to vibrate comprises:
    applying a vibrating source transducer to the casing tread area by roller means positioned such that the vibrating force remains in contact with the casing as the casing is rotated circumferentially.

3. The method of claim 1 wherein the step of detecting symmetry imbalance comprises:
    applying a pair of receiver transducers respectively to the opposite side walls of the casing at points equally spaced from the point of application of the source transducer.

4. The method of claim 1 further comprising the step of:
    measuring the frequency and changes thereof at which the casing is vibrating as the casing is rotated circumferentially.

5. The method of claim 4 further comprising the step of:
    continuously measuring the output frequency of the source transducer as the frequency of operation thereof is varied to maintain resonance.

6. The method of claim 5 wherein the step of detecting symmetry imbalance further comprises:
    comparing the output signals generated by the receiver transducers.

7. The method of claim 6 further comprising the step of:
    comparing the output of one of the receiver transducers with the results of the comparison of the outputs of both receiver transducers.

8. Apparatus for use in the non-destructive testing of tires comprising:
    vibratory source transducer means for application to the tread area of a tire casing to be tested;
    means for causing said source transducer means to track a resonant frequency of the test tire;
    first receiver transducer means for application to a first side wall of the test tire, said first receiver transducer means generating an output signal commensurate with the magnitude of vibrations transmitted thereto through the tire casing from said source transducer means;
    second receiver transducer means for application to the second side wall of the test tire at a position oppositely disposed to said first receiver transducer means, said second receiver transducer means generating an output signal commensurate with the magnitude of vibrations transmitted thereto through the tire casing from said source transducer means, said first and second receiver transducer means and said source transducer means being intended for positioning in a plane defined by a tire cross-section; and
    means for comparing the output signals generated by said receiver transducer means to provide an indication of a transmission symmetry imbalance.

9. The apparatus of claim 8 further comprising:
means for measuring the source transducer means operating frequency and for providing an output signal commensurate therewith.

10. The apparatus of claim 9 wherein said means for comparing the receiver transducer means output signals comprises:
comparator means responsive to the transducer output signals for providing an output signal commensurate with variations therebetween indicative of symmetry imbalances; and
means responsive to a symmetry imbalance signal for providing an indication thereof.

11. The apparatus of claim 10 wherein the output of said frequency measuring means is applied to said indication providing means for display and wherein said apparatus further comprises:
means delivering the output of one of said receiver transducers to said indication providing means for display.

* * * * *